United States Patent [19]

Ohnishi

[11] Patent Number: 4,770,950

[45] Date of Patent: Sep. 13, 1988

[54] THIN FILM ELECTROLUMINESCENT DEVICE

[75] Inventor: Hideomi Ohnishi, Matsuyama, Japan

[73] Assignee: Murata Manufacturing Co. Ltd., Japan

[21] Appl. No.: 27,441

[22] Filed: Mar. 18, 1987

[30] Foreign Application Priority Data

Mar. 18, 1986 [JP] Japan .............................. 61-61606

[51] Int. Cl.[4] ........................ C09K 11/46; B32B 5/16

[52] U.S. Cl. ................................ 428/690; 428/691; 252/301.45; 313/503

[58] Field of Search ...................... 428/917, 690, 691; 313/503; 252/301.45

[56] References Cited

U.S. PATENT DOCUMENTS

| | | | |
|---|---|---|---|
| 4,082,889 | 4/1978 | DiStefano | 428/690 X |
| 4,264,677 | 4/1981 | Koyama et al. | 428/690 X |
| 4,661,373 | 4/1987 | Kato et al. | 428/917 X |

*Primary Examiner*—Nancy A. B. Swisher

*Attorney, Agent, or Firm*—Ostrolenk, Faber, Gerb & Soffen

[57] ABSTRACT

A thin film luminescent device comprises a luminescent layer which consists essentially of a luminous matrix compound of an alkaline earth metal sulfide, a luminescent center element of the rare earth elements embeded in the matrix compound, and additives of copper incorporated in the matrix compound. The content of copper is not more than 1 wt % with respect to the amount of the alkaline earth metal sulfide in the thin film luminescent layer.

8 Claims, 2 Drawing Sheets

THIN FILM ELECTROLUMINESCENT DEVICE

BACKGROUND OF THE INVENTION

This invention relates to a thin film electroluminescent device which may be operated at a low voltage to obtain high luminescent efficiency and high brightness.

Electroluminescent devices are generally composed of a transparent substrate, a thin film luminescent layer comprising an electroluminescent phosphor, and two electrodes placed on opposite sides of the luminescent layer. Since such electroluminescent devices are to be employed as display devices, they are required to have a low driving voltage, high brightness and high efficiency. In order to obtain such luminescent properties, a thin film luminescent layer in the device plays an important part and is one of the important factors is production of the luminescent layer.

As a host or matrix compound of the thin film luminescent layers, there have been used compound such as ZnS, or an alkaline earth metal sulfide such as CaS, BaS, SrS and the like. As the luminescent layers of the kind wherein an alkaline earth metal sulfide is used as the host compound, there have been known those listed in Table 1.

TABLE 1

| Host compound | Luminescent center element | Color |
|---|---|---|
| CaS | Ce | green |
| CaS | Eu | red |
| SrS | Ce | blue/green |

When producing such luminescent layers by electron beam evaporation, a substrate on which a luminescent layer is formed must be maintained at a temperature of 600° C. or above in order to obtain high brightness since it is impossible to obtain high brightness if thin film luminescent layers are formed on a substrate maintained at a low temperature. However, such a high temperature requires use of the substrate with a high heat resistance and can confer undesired stress on the deposited thin film due to difference in thermal expansion coefficient between the substrate and the thin film. On the other hand, it has been proposed to produce thin film luminescent layers by sputtering. However, brightness sufficient for the practical use can not be obtained with the compositions of the prior art at a low driving voltage and luminescent efficiency is too low to put into practical use.

SUMMARY OF THE INVENTION

It is therefore an object of the present invention to provide a thin film electroluminescent device with a low driving voltage, high brightness and high luminescent efficiency.

A thin film electroluminescent device according to the present invention comprises a thin film luminescent layer consisting essentially of a luminous host or matrix compound of an alkaline earth metal sulfide, a luminescent center element of the rare earth elements embedded in the matrix compound, and additives of copper incorporated in the matrix compound.

The content of copper is preferably not more than 1 wt% with respect to the content of alkaline earth metal sulfide in the luminescent layer.

The alkaline earth metal sulfides used as the host or matrix compound include, without being limited to, CaS, BaS and SrS.

The rare earth elements used as the luminescent center element include, without being limited to, Ce and Eu. As raw materials for these luminescent center elements, there may be used those such as $CeCl_3$, $Ce_2S_3$, $EuCl_3$, EuS, $EuF_3$ and othr halides of the rare earth elements.

As a raw material for the additives, there may be used those such as $CuBr_2$, $CuCl_2$, $Cu_2S$ and other copper compounds which allow copper present in the form of a compound other than oxide in the matrix compound.

The thin film luminescent layer having the above composition may be formed by sputtering, electron beam evaporation, or the like. From the point of view of industrial productivity, it is preferred to use sputtering since the sputtering makes it possible to deposit not only luminescent layers but also other layers such as insulating layers of the electroluminescent devices. Also, the sputtering makes it possible to deposit luminescent layers with high quality on a substrate maintained at a low temperature of not more than 300° C.

The thin film luminescent device according to the present invention can be operated at a low driving voltage with high brightness and high efficiency.

The invention will be further explained with reference to the accompanying drawings which show, by way of example only, an embodiment of the present invention.

DESCRIPTION OF THE PREFERRED EMBODIMENT

Figure 1:
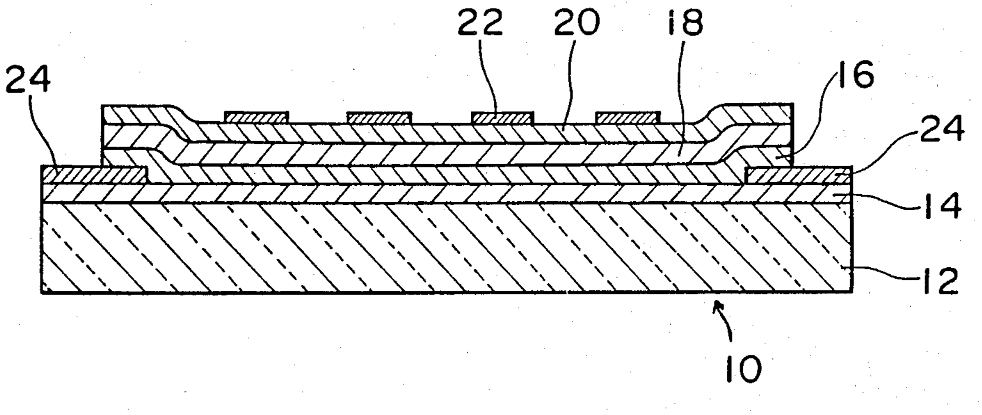
FIG. 1 is a section view of a thin film luminescent device embodying the present invention.

Referring now to FIG. 1, there is shown a typical structure of a thin film luminescent device according to the present invention. The thin film luminescent device 10 comprises a transparent insulating substrate 12 in the form of a plate of a transparent insulating material, typically glass, on which is formed a transparent electrode 14 such as, for example, of a $In_2O_3$-$SnO_2$ oxide alloy. A pair of parallel terminal electrodes 24 are fomred on the transparent electrode 14 along its opposite edge portions. Formed on the transparent electrode 14 is a thin film luminescent layer 18 sandwiched by the first and second insulating layers 16 and 20. The insulating layers 16 and 20 are of $Ta_2O_5$.

The luminescent layer 18 consists essentially of a matrix compound of alkaline earth metal sulfide, a luminescent center element of one or more rare earth elements embedded in the matrix compound, and additives of copper incorporated in the matrix compound. A thin conducting backing or backing electrode 22 is formed on the second insulating layer 20. The backing electrode 22 used as a common electrode or individual electrodes may be formed by electron beam evaporation of aluminum.

EXAMPLES

The luminescent device with the above structure was produced in the following manner.

Using glass, NA 40, made by Hoya Corporation, there was firstly prepared a transparent substrate on which thin films of electrodes, a luminescent layer and insulating layers were in turn formed in accordance with the following steps.

(1) Formation of transparent electrode

A transparent electrode was formed on the transparent substrate by sputtering with a target of an $In_2O_3$-$SnO_2$ oxide alloy. The deposited film of $In_2O_3$-$SnO_2$ has a thickness of about 2000 Å.

(2) Formation of terminal electrodes

On the transparent substrate with the transparent electrode, a mask was placed so as to expose opposite edge portions of the electrode and then aluminum was deposited on the transparent electrode to form terminal electrodes thereon.

(3) Formation of First insulating layer

The transparent substrate with the transparent electrode was then placed in a bell jar of a radio-frequency diode sputtering apparatus. The bell jar was evacuated in the known manner and then $Ta_2O_5$ was sputtered on the transparent electrode under the conditions listed in Table 2 to form the first insulating layer with a thickness of about 3000 Å.

TABLE 2

| | |
|---|---|
| Target | Sintered body of $Ta_2O_5$ |
| Type of Sputtering | Radio frequency diode sputtering |
| High frequency power | 3.8 W/cm$^2$ |
| Sputtering gas | Mixture of Ar and $O_2$ ($Ar/O_2$ = 90/10) |
| Pressure | 40 Pa |
| Temp. of substrate | 150° C. at maximum |
| Deposition rate | about 50Å/min |

(4) Formation of luminescent layers

Figure 3:
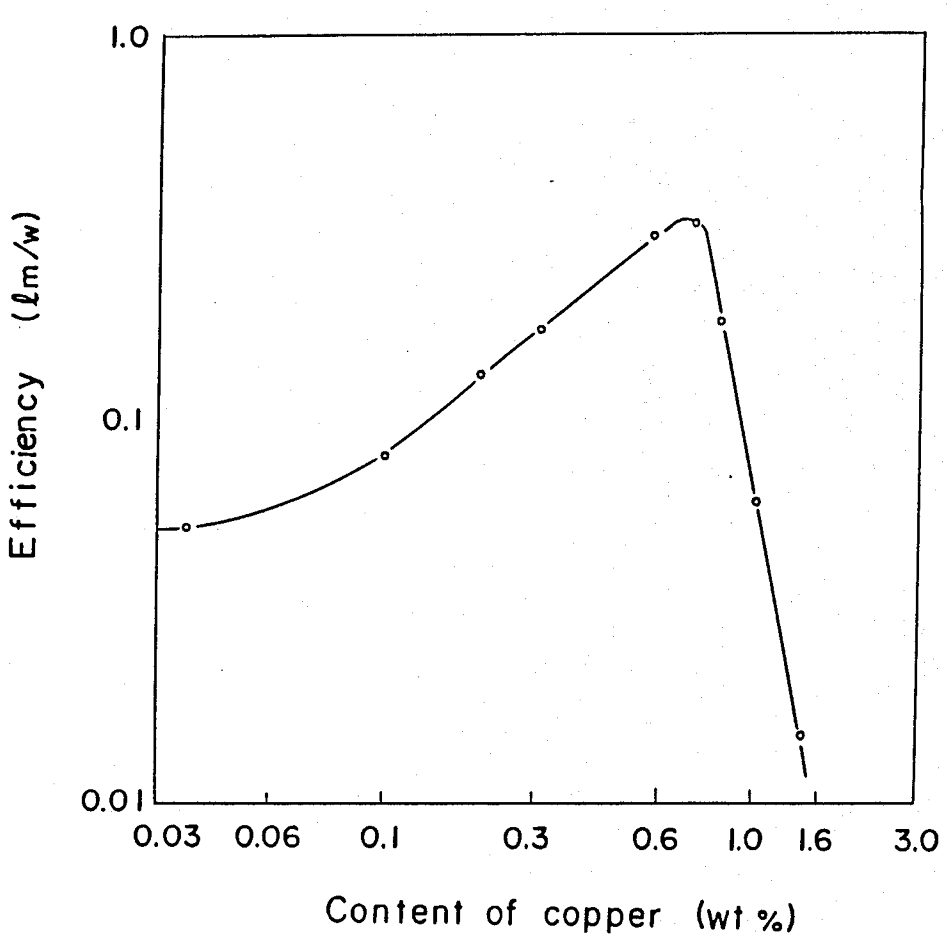
FIG. 3 is a graph showing variation of brightness as a function of copper content in the luminescent layer of the thin film luminescent device.

A luminescent layer was formed on the first insulating layer by sputtering with a target prepared by mixing powders of CaS, 1.0 wt% of $EuF_3$, and 0.14 to 5 wt% of $CuBr_2$ and then heating the resultant mixture in an argon atmosphere at 900° C. for 3 hours. Each content of the additives of copper was about 0.04 to 1.4 wt% in terms of Cu as shown in FIG. 3. The target was arranged in a stainless steel tray and then placed in a bell jar. Sputtering was carried out under the conditions listed in Table 3.

TABLE 3

| | |
|---|---|
| Type of Sputtering | Radio frequency diode sputtering |
| High frequency power | 2.6 W/cm$^2$ |
| Sputtering gas | Mixture of Ar (55%)-He (40%)-$H_2S$ (5%) |
| Pressure | 6 to 8 Pa |
| Temp. of substrate | 150° C. at maximum |
| Deposition rate | about 100Å/min |
| Layer Thickness | 4000Å |

(5) The second insulating layer of $Ta_2O_5$ was formed on the luminescent layer in the same manner as the first insulating layer.

(6) The thus prepared structural body was then provided with back electrodes of Al by electron beam evaporation to complete a thin film electroluminescent device shown in FIG. 1.

For comparison, a thin film electroluminescent device was prepared in the same manner and under the same conditions described above with a target for a luminescent layre that consists of powders of 99.0 wt% of CaS and 1.0 wt% of $EuF_3$ and contains no $CuBr_2$.

Figure 2:
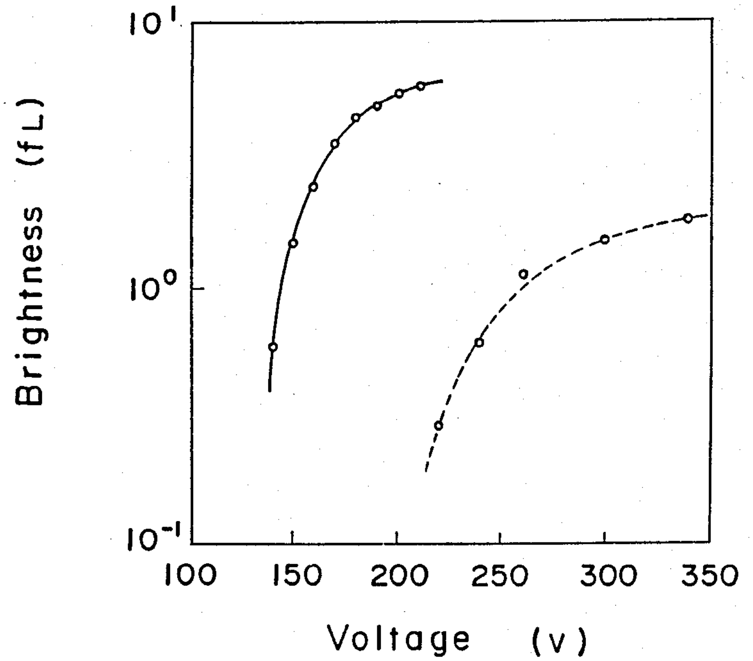
FIG. 2 is a graph showing brightness—voltage characteristics of the thin film luminescent device according to the present invention.

For the electroluminescent device comprising a luminescent layer with 1 wt% copper, brightness—voltage characteristics was measured. Results are shown in FIG. 2. In this figure, results for a comparative specimen are also shown in a dash line.

As can be seen from the results in FIG. 2, the thin film luminescent device according to the present invention has a threshold voltage lower than that of the conventional device by about 100 V. This means that the incorporation of copper into the matrix compound of the luminous layer contributes to lower the threshold voltage of the luminescent device. In addition, the brightness in 6 fL at the maximum which is much improved as compared with that of the conventional device with the maximum brightness of 1.6 fL.

FIG. 3 shows variation of luminescent efficiency of the electroluminescent device as a function of the content of Cu. From this figure, it will be seen that the incorporation of Cu into the luminescent layer improves the luminescent efficiency. However, if the content of Cu exceeds 1 wt% with respect to the amount of the matrix compound, the efficiency abruptly decreases. The experiments have showed that similar results can be obtained even when luminescent layer is formed by the combination of other matrix compound, other phosphor and other copper compound.

What I claim is:

1. A thin film luminescent (EL) device comprising:
a substrate;
a first electrode layer formed on said substrate;
a thin-film EL layer formed on said first electrode layer;
second electrode means formed on the EL layer;
said EL layer consisting essentially of a luminous matrix compound of an alkaline earth metal sulfide, a luminescent center element of the rare earth elements embedded in the matrix compound, and additives of copper incorporated in the matrix compound.

2. The thin film electroluminescent device according to claim 1 wherein the content of copper is substantially not more than 1 wt% with respect to the amount of the alkaline earth metal sulfide in the thin film luminescent (EL) layer.

3. A thin film EL device as in claim 1, wherein said first electrode layer has a terminal electrode formed on a peripheral portion thereof.

4. A thin film EL device as in claim 1, wherein said substrate is substantially a transparent insulating substrate.

5. A thin film EL device as in claim 4, wherein said first electrode layer is substantially transparent.

6. A thin film EL device as in claim 1, further comprising a pair of insulating layers formed between said EL layer and said first and second electrode layers, respectively.

7. An electroluminescent composition consisting essentially of a luminous matrix compound of an alkaline earth metal sulfide, a luminescent center element of the rare earth elements embedded in the matrix compound, and additives of copper incorporated in the matrix compound.

8. An electroluminescent composition according to claim 7, wherein the content of copper is substantially not more than 1 wt% with respect to the amount of the alkaline earth metal sulfide.

* * * * *